(12) United States Patent
Zhao et al.

(10) Patent No.: US 11,140,698 B2
(45) Date of Patent: Oct. 5, 2021

(54) DATA TRANSMISSION METHOD AND TERMINAL

(71) Applicant: CHINA ACADEMY OF TELECOMMUNICATIONS TECHNOLOGY, Beijing (CN)

(72) Inventors: Rui Zhao, Beijing (CN); Xueming Pan, Beijing (CN); Ying Peng, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 48 days.

(21) Appl. No.: 16/496,951

(22) PCT Filed: Feb. 6, 2018

(86) PCT No.: PCT/CN2018/075480
§ 371 (c)(1),
(2) Date: Sep. 23, 2019

(87) PCT Pub. No.: WO2018/171352
PCT Pub. Date: Sep. 27, 2018

(65) Prior Publication Data
US 2021/0105800 A1   Apr. 8, 2021

(30) Foreign Application Priority Data
Mar. 23, 2017   (CN) .......................... 201710179605.5

(51) Int. Cl.
*H04W 72/12* (2009.01)
*H04L 1/00* (2006.01)
(Continued)

(52) U.S. Cl.
CPC ....... *H04W 72/1263* (2013.01); *H04L 1/0038* (2013.01); *H04W 72/02* (2013.01);
(Continued)

(58) Field of Classification Search
None
See application file for complete search history.

(56) References Cited

U.S. PATENT DOCUMENTS

2010/0009688 A1   1/2010   Lim et al.
2016/0249355 A1*  8/2016   Chae ..................... H04L 5/0091
(Continued)

FOREIGN PATENT DOCUMENTS

CN   104620658 A   5/2015
CN   105228248 A   1/2016
(Continued)

*Primary Examiner* — Chi H Pham
*Assistant Examiner* — Vladislav Y Agureyev
(74) *Attorney, Agent, or Firm* — Kilpatrick Townsend & Stockton LLP

(57) ABSTRACT

Disclosed in the present application are a data transmission method and terminal, the data transmission method comprising: a first terminal selects from a time frequency resource set of scheduling allocation SA information the time frequency resources of a first type of SA information; the first terminal sends the first type of SA information on the time frequency resources of the first type of SA information according to a first physical layer format and, on the basis of an indication of the first type of SA information, sends data associated with the first type of SA information according to a second physical layer format; the first SA information comprises time frequency resource indication information of the data associated with the first type of SA information.

8 Claims, 12 Drawing Sheets

(51) Int. Cl.
*H04W 72/02* (2009.01)
*H04W 72/04* (2009.01)

(52) U.S. Cl.
CPC ... *H04W 72/0446* (2013.01); *H04W 72/0453* (2013.01); *H04W 72/1257* (2013.01)

(56) References Cited

U.S. PATENT DOCUMENTS

| | | | |
|---|---|---|---|
| 2016/0295624 A1* | 10/2016 | Novlan | H04W 72/04 |
| 2016/0337839 A1* | 11/2016 | Chae | H04L 5/14 |
| 2017/0041971 A1* | 2/2017 | Kim | H04W 72/12 |
| 2017/0142741 A1* | 5/2017 | Kaur | H04W 76/14 |
| 2018/0146484 A1* | 5/2018 | Kahtava | H04W 24/10 |
| 2018/0227882 A1* | 8/2018 | Freda | H04W 72/085 |
| 2018/0263026 A1* | 9/2018 | Loehr | H04W 72/10 |
| 2018/0338319 A1* | 11/2018 | Kim | H04W 72/1278 |
| 2019/0029028 A1* | 1/2019 | Chae | H04W 72/12 |
| 2019/0052411 A1* | 2/2019 | Chae | H04L 1/08 |
| 2019/0246385 A1* | 8/2019 | Lin | H04W 72/044 |
| 2020/0068531 A1* | 2/2020 | Sundberg | H04W 72/0453 |
| 2020/0229209 A1* | 7/2020 | Sorrentino | H04W 72/1242 |
| 2020/0267702 A1* | 8/2020 | Kim | H04W 72/042 |
| 2020/0296690 A1* | 9/2020 | Lee | H04W 4/40 |
| 2020/0351904 A1* | 11/2020 | Chae | H04W 72/12 |

FOREIGN PATENT DOCUMENTS

| | | |
|---|---|---|
| CN | 106332284 A | 1/2017 |
| WO | 2008038872 A2 | 4/2008 |
| WO | 2018174630 A1 | 9/2018 |

\* cited by examiner

DATA TRANSMISSION METHOD AND TERMINAL

This application is a National Stage of International Application No. PCT/CN2018/075480, filed Feb. 6, 2018, which claims the priority of Chinese Patent Application No. 201710179605.5, filed with the Chinese Patent Office on Mar. 23, 2017, and entitled "A data transmitting method and a Terminal", both of which are hereby incorporated by reference in their entireties.

FIELD

The present invention relates to the field of wireless communications, and particularly to a data transmitting method and a Terminal.

BACKGROUND

In the Vehicle-to-Everything (V2X) technologies of the Long Term Evolution (LTE) Rel-14, the granularity of a time resource occupied for Vehicle to Vehicle (V2V) transmission of data is a legacy normal LTE sub-frame with the length of 1 ms. The LTE-based V2V technologies are based upon an improvement to the LTE Device to Device (D2D) technologies, where Scheduling Assignment (SA) information is transmitted over a Physical Sidelink Control Channel (PSCCH), and data are transmitted over a Physical Sidelink Shared Channel (PSSCH). A receiver detects the SA information carried in the control channel, and receives the data according to the received SA information.

As the V2X technologies are evolving, there is a demand for higher performance (e.g., a delay, reliability, etc.) of data transmission between User Equipments (UEs), so it is desirable to develop a new data transmission mode as required for the evolving V2X technologies.

SUMMARY

Embodiments of the invention provide a data transmitting method and a UE so as to transmit data between UEs as required for the evolving V2X technologies.

There are the following particular technical solutions according to the embodiments of the invention.

In a first aspect, an embodiment of the invention provides a data transmitting method including:

selecting, by a first UE, a time-frequency resource of a first category of Scheduling Assignment (SA) information from a set of time-frequency resources of SA information; and transmitting, by the first UE, the first category of SA information over the time-frequency resource of the first category of SA information in a first physical-layer format, and transmitting data associated with the first category of SA information in a second physical-layer format according to indication information in the first category of SA information, wherein the first category of SA information includes the time-frequency resource indication information of the data associated with the first category of SA information.

Optionally, the method further includes:

selecting, by the first UE, a time-frequency resource of a second category of SA information from the set of time-frequency resources of SA information, and transmitting the second category of SA information in a third physical-layer format over the time-frequency resource of the second category of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, wherein the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, data of a same UE, or data of different UEs is transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format.

Optionally, the first physical-layer format is different from the second physical-layer format, wherein a time length occupied by a piece of first category of SA information in the first physical-layer format is same as a time length occupied by data associated with the first category of SA information in the second physical-layer format, and a transmission modes for a piece of first category of SA information in the first physical-layer format is different from a transmission mode for data associated with the first category of SA information in the second physical-layer format.

Optionally, the first category of SA information includes at least one of: Modulation and Coding Scheme (MCS) indication information of the data associated with the first category of SA information; indication information of a Demodulation Reference Signal (DMRS) sequence; indication information of a data transmission mode; redundancy version indication information; resource reservation periodicity indication information; or service priority indication information.

In a second aspect, an embodiment of the invention provides a data receiving method including:

detecting, by a second UE blindly, a first category of Scheduling Assignment (SA) information transmitted by a first UE in a first physical-layer format over a time-frequency resource of the first category of SA information; and detecting, by the second UE, data associated with the first category of SA information, transmitted by the first UE in a second physical-layer format, according to the detected first category of SA information, wherein the time-frequency resource of the first category of SA information is selected by the first UE from a set of time-frequency resources of SA information, and the first category of SA information includes time-frequency indication information of the data associated with the first category of SA information.

Optionally, the method further includes:

detecting, by the second UE blindly, a second category of SA information transmitted by the first UE in a third physical-layer format over a time-frequency resource of the second category of SA information, wherein the time-frequency resource of the second category of SA information is selected by the first UE from the set of time-frequency resources of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, wherein the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, data of a same UE, or data of different UEs is transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format.

Optionally, the first physical-layer format is different from the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is different from a transmission mode for data associated with the first category of SA information in the second physical-layer format.

Optionally, the first category of SA information includes at least one of: Modulation and Coding Scheme (MCS) indication information of the data associated with the first category of SA information; indication information of a Demodulation Reference Signal (DMRS) sequence; indication information of a data transmission mode; redundancy version indication information; resource reservation periodicity indication information; or service priority indication information.

In a third aspect, an embodiment of the invention provides a terminal including:

a selecting module configured to select a time-frequency resource of a first category of Scheduling Assignment (SA) information from a set of time-frequency resources of SA information; and a transmitting module configured to transmit the first category of SA information over the time-frequency resource of the first category of SA information in a first physical-layer format, and to transmit data associated with the first category of SA information in a second physical-layer format according to indication information in the first category of SA information, wherein the first category of SA information includes the time-frequency resource indication information of the data associated with the first category of SA information.

Optionally, the selecting module is further configured to select a time-frequency resource of a second category of SA information from the set of time-frequency resources of SA information, and the transmitting module is further configured to transmit the second category of SA information in a third physical-layer format over the time-frequency resource of the second category of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, wherein the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, data of a same UE, or data of different UEs is transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format.

Optionally, the first physical-layer format is different from the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is different from a transmission mode for data associated with the first category of SA information in the second physical-layer format.

Optionally, the first category of SA information includes at least one of: Modulation and Coding Scheme (MCS) indication information of the data associated with the first category of SA information; indication information of a Demodulation Reference Signal (DMRS) sequence; indication information of a data transmission mode; redundancy version indication information; resource reservation periodicity indication information; or service priority indication information.

In a fourth aspect, an embodiment of the invention further provides a terminal including:

a first detecting module configured to detect blindly a first category of Scheduling Assignment (SA) information transmitted by a first UE in a first physical-layer format over a time-frequency resource of the first category of SA information; and a second detecting module configured to detect data associated with the first category of SA information, transmitted by the first UE in a second physical-layer format, according to the detected first category of SA information, wherein the time-frequency resource of the first category of SA information is selected by the first UE from a set of time-frequency resources of SA information, and the first category of SA information includes time-frequency indication information of the data associated with the first category of SA information.

Optionally, the terminal further includes:

a selecting module configured to select a time-frequency resource of a first category of SA information from the set of time-frequency resources of SA information; and a transmitting module configured to transmit the first category of SA information over the time-frequency resource of the first category of SA information in the first physical-layer format, and to transmit data associated with the first category of SA information in the second physical-layer format according to indication information in the first category of SA information, wherein the at least one piece of first category of SA information includes at least the time-frequency resource indication information of the data associated with the at least one piece of first category of SA information.

Stated otherwise, the data transmitting device above according to the embodiment of the invention includes the first detecting module and the second detecting module, but also the selecting module and the transmitting module, so the data transmitting device can operate as both a data receiver and a data transmitter.

Optionally, the first detecting module is further configured: to detect blindly a second category of SA information transmitted by the first UE in a third physical-layer format over a time-frequency resource of the second category of SA information, wherein the time-frequency resource of the second category of SA information is selected by the first UE from the set of time-frequency resources of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, wherein the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, data of the a UE, or data of different UEs is transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format.

Optionally, the first physical-layer format is different from the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is different from a transmission mode for data associated with the first category of SA information in the second physical-layer format.

In a fifth aspect, an embodiment of the invention further provides a data transmitting device, e.g., a terminal, which includes:

a memory configured to store program instructions; and a processor configured to read and execute the program instruction stored in the memory:

to select a time-frequency resource of a first category of Scheduling Assignment (SA) information from a set of time-frequency resources of SA information; and to transmit the first category of SA information through a transceiver over the time-frequency resource of the first category of SA information in a first physical-layer format, and to transmit data associated with the first category of SA information through the transceiver in a second physical-layer format according to indication information in the first category of SA information, wherein the first category of SA information includes the time-frequency resource indication information of the data associated with the first category of SA information.

In a sixth aspect, an embodiment of the invention further provides a data transmitting device, e.g., a terminal, which includes:

a memory configured to store program instructions; and a processor configured to read and execute the program instruction stored in the memory:

to detect blindly a first category of Scheduling Assignment (SA) information transmitted by a first UE in a first physical-layer format over a time-frequency resource of the first category of SA information; and a second detecting module configured to detect data associated with the first category of SA information, transmitted by the first UE in a second physical-layer format, according to the detected first category of SA information, wherein the time-frequency resource of the first category of SA information is selected by the first UE from a set of time-frequency resources of SA information, and the first category of SA information includes time-frequency indication information of the data associated with the first category of SA information; and a transceiver configured to transmit and receive data under the control of the processor.

Optionally, the processor is further configured:

to select a time-frequency resource of a first category of SA information from the set of time-frequency resources of SA information; and to transmit the first category of SA information through the transceiver over the time-frequency resource of the first category of SA information in the first physical-layer format, and to transmit data associated with the first category of SA information in the second physical-layer format according to indication information in the first category of SA information, wherein the at least one piece of first category of SA information includes at least the time-frequency resource indication information of the data associated with the at least one piece of first category of SA information.

In a seventh aspect, an embodiment of the invention further provides a computer storage medium storing computer executable instructions configured to cause the computer to perform the method above.

In the technical solutions above according to the embodiments of the invention, a first UE selects a time-frequency resource of a first category of Scheduling Assignment (SA) information from a set of time-frequency resources of SA information, transmits the first category of SA information over the time-frequency resource of the first category of SA information in a first physical-layer format, and transmits data associated with the first category of SA information in a second physical-layer format according to indication information in the first category of SA information, wherein the first category of SA information includes the time-frequency resource indication information of the data associated with the first category of SA information, so that the data can be transmitted between the UEs.

DETAILED DESCRIPTION OF THE EMBODIMENTS

Figure 2A:
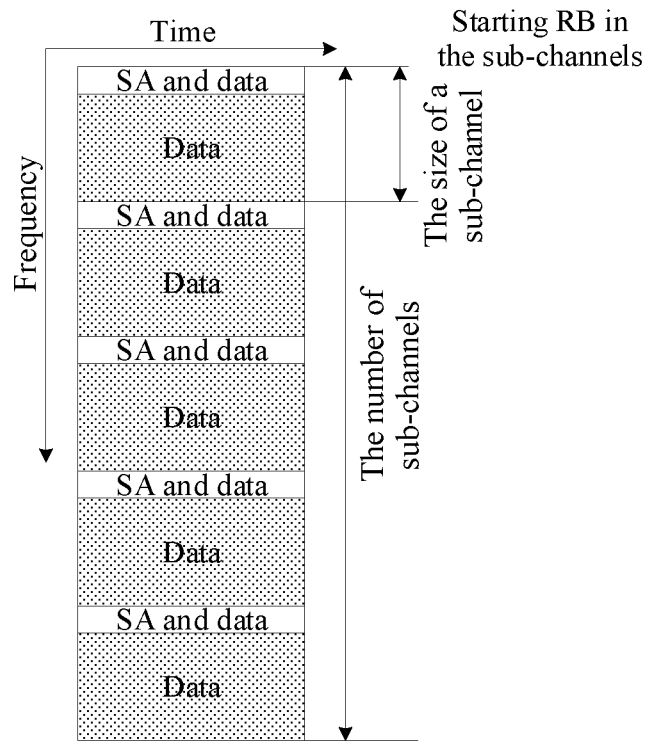
FIG. 2A is a schematic diagram of configured time-frequency resources in a sub-frame in an adjacent-frequency mode in the prior art.
Figure 2B:
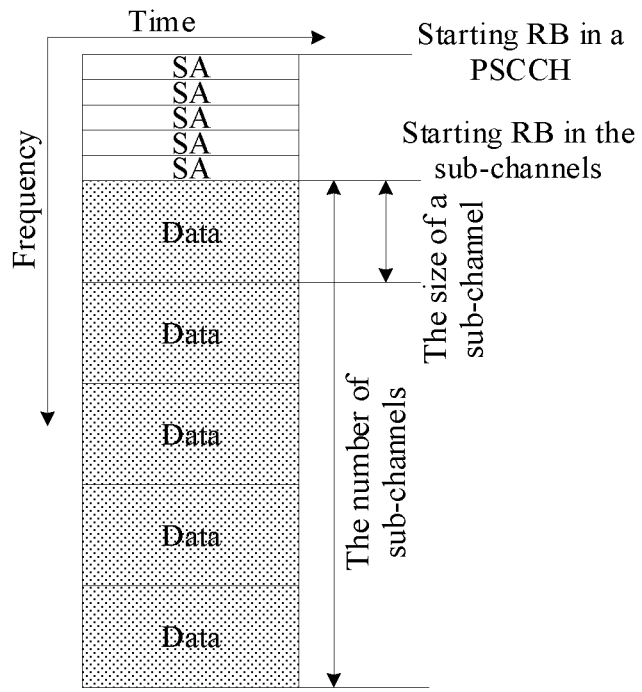
FIG. 2B is a schematic diagram of configured time-frequency resources in a sub-frame in a nonadjacent-frequency mode in the prior art.

In the LTE Rel-14 V2V technologies, SA information of the same UE, and data associated with the SA information are transmitted in the same sub-frame, and the SA information, and the data associated with the SA information can be transmitted in the following two frequency division multiplexing modes: in the first mode, the SA information, and the data associated with the SA information are transmitted in a sub-frame in an adjacent-frequency mode, and time-frequency resources in the sub-frame are configured as illustrated in FIG. 2A, where a frequency resource occupied by a piece of SA information is adjacent to a frequency resource occupied by data associated with the SA information; and in the second mode, the SA information, and the data associated with the SA information are transmitted in a sub-frame in a non-adjacent frequency mode, and time-frequency resources in the sub-frame are configured as illustrated in FIG. 2B, where the position a frequency resource occupied by a piece of SA information corresponds to the start position of a frequency resource occupied by data associated with the SA information. In these two modes, a piece of SA information always occupies two Physical Resource Blocks (PRBs) in the frequency domain, and a piece of SA information can schedule data transmission in a plurality of sub-channels.

Figure 1A:
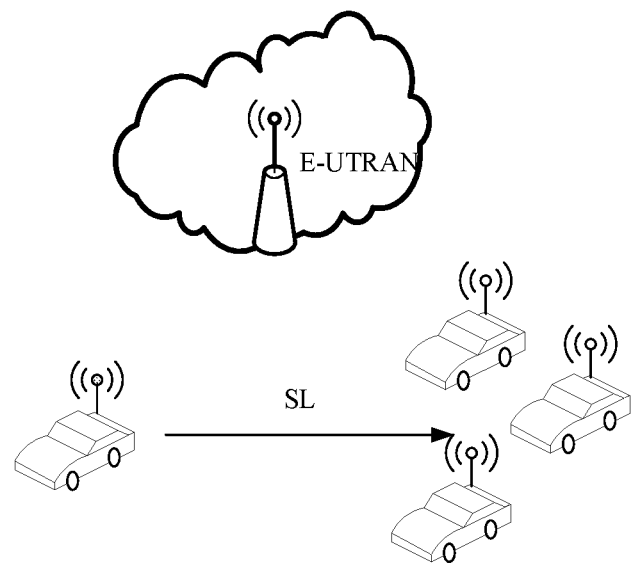
FIG. 1A is a schematic diagram of a UE selecting a resource by itself in the prior art.
Figure 1B:
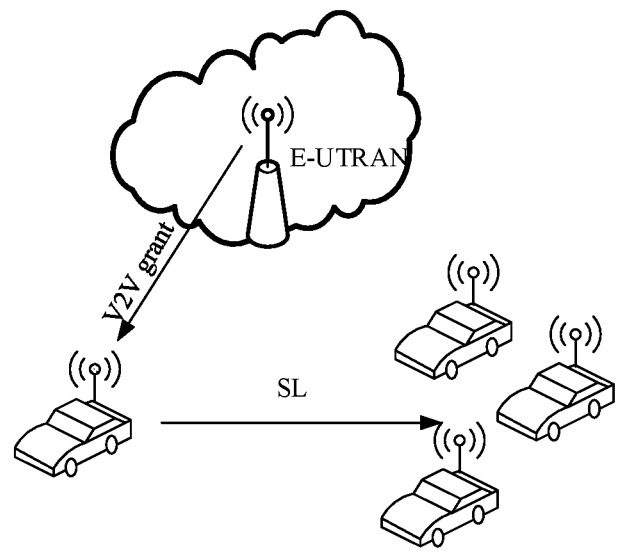
FIG. 1B is a schematic diagram of a base station assisting in selecting a resource in the prior art.

In the LTE-based V2V technologies, a resource for transmitting data between one vehicle and another is selected in the following two implementations: in the first implementation, a UE selects a resource by itself, and as illustrated in FIG. 1A, the UE selects a resource by itself from a V2X resource pool preconfigured in the UE, or a V2X resource pool configured by a base station, according to a resource occupancy condition; and in the second implementation, the base station assists in selecting a resource, and as illustrated in FIG. 1B, when the UE is located in a coverage area of a network, the base station sends a V2V grant message over a Physical Downlink Control Channel (PDCCH) or an Enhanced Physical Downlink Control Channel (EPDCCH) to schedule a resource for V2V communication, where the V2V grant message indicates, to the UE to transmit the data, a time-frequency resource for transmitting the SA information and the data.

Figure 3:
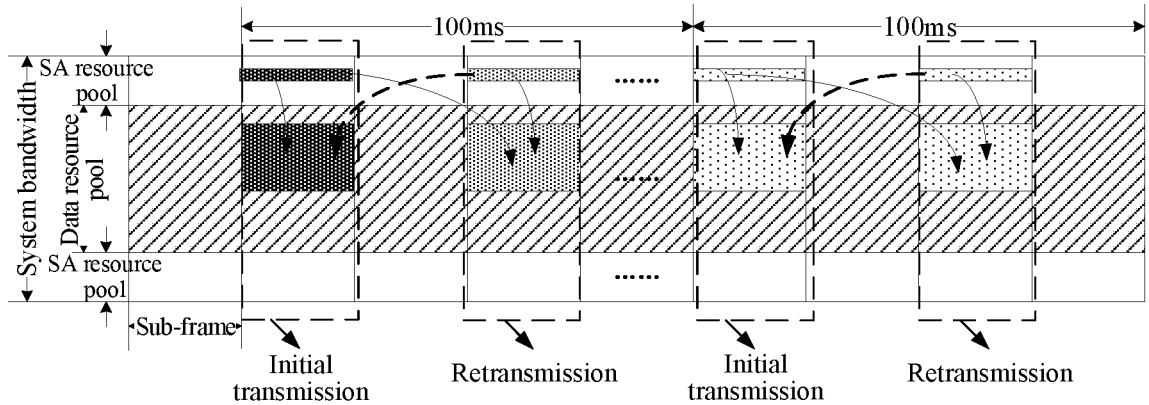
FIG. 3 is a schematic diagram of data retransmission in the prior art.

Furthermore, data can be transmitted at most twice (the number of times that the data can be transmitted can be configured), and if the data can be transmitted twice, then the data will be initially transmitted for the first time, and retransmitted for the second time, where SA information associated with the initially transmitted data, and SA information associated with the retransmitted data carries both resource indication information of the initially transmitted data and the retransmitted data as illustrated in FIG. 3. If the SA information associated with the initially transmitted data is received in error, and the SA information associated with the retransmitted data is received correctly, then the UE will not detect the initially transmitted data according to the resource indication information of the initially transmitted data, in the SA information associated with the retransmitted data.

In order to cater to the evolving V2X technologies, SA information, and a physical-layer format for transmitting the SA information is newly defined in the embodiments of the invention. In order to distinguish the new SA information from the original SA information, the newly defined SA information will be referred to as a first category of SA information, and the original SA information will be referred to as a second category of SA information in the embodiments of the invention. A time length occupied by the first category of SA information is less than a time length of a legacy sub-frame, and a time length occupied by the second category of SA information is the time length of a legacy sub-frame. A UE supporting detection of the first category of SA information, or a UE supporting transmission of the second category of SA information using multiple antennas will be referred to as a new UE, and a UE which does not support detection of the first category of SA information, but supports the second category of SA information will be referred to as a legacy UE.

Figure 4:
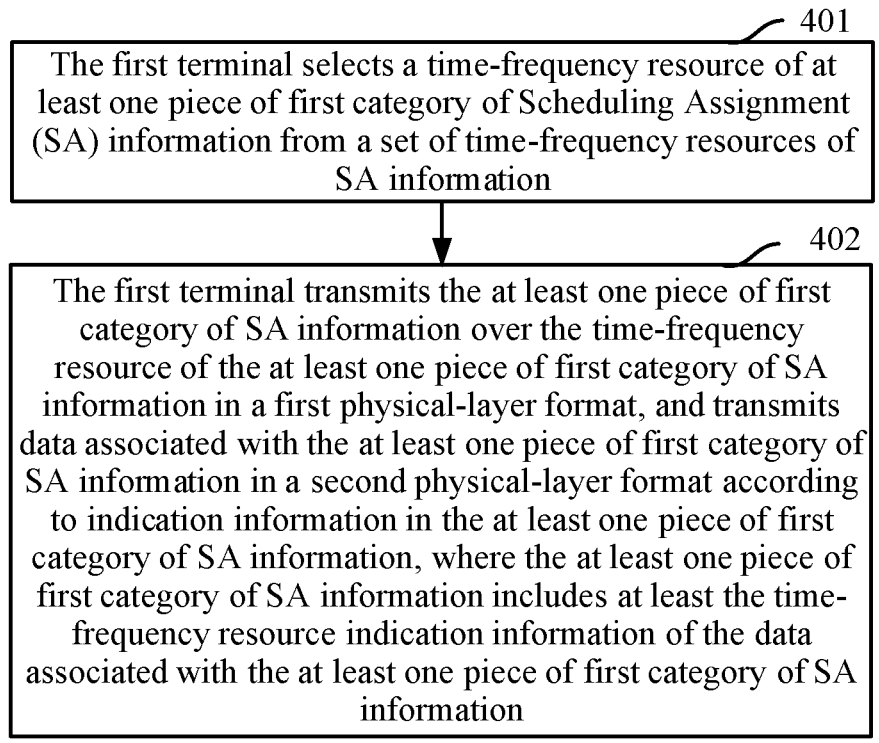
FIG. 4 is a schematic flow chart of a data transmitting method according to an embodiment of the invention.

FIG. 4 illustrates a flow chart of a first UE (i.e., a new UE) transmitting data to another UE according to an embodiment of the invention, where the flow includes the following steps.

In the step 401, the first UE selects a time-frequency resource of at least one piece of first category of Scheduling Assignment (SA) information from a set of time-frequency resources of SA information.

In an implementation, the set of time-frequency resources of SA information is preconfigured in the first UE, or the first UE receives the set of time-frequency resources of SA information, transmitted by a base station before it transmits at least one piece of first category of SA information, where the set of time-frequency resources of SA information includes time-frequency resources of a plurality of pieces of first category of SA information.

In the step 402, the first UE transmits the at least one piece of first category of SA information over the time-frequency resource of the at least one piece of first category of SA information in a first physical-layer format, and transmits data associated with the at least one piece of first category of SA information in a second physical-layer format according to indication information in the at least one piece of first category of SA information, where the at least one piece of first category of SA information includes at least the time-frequency resource indication information of the data associated with the at least one piece of first category of SA information.

In an implementation, the first UE can transmit a first category of SA information, and data associated with the category of SA information to a plurality of UEs by broadcasting, multi-casting, etc., the first category of SA information and the data.

Figure 5:
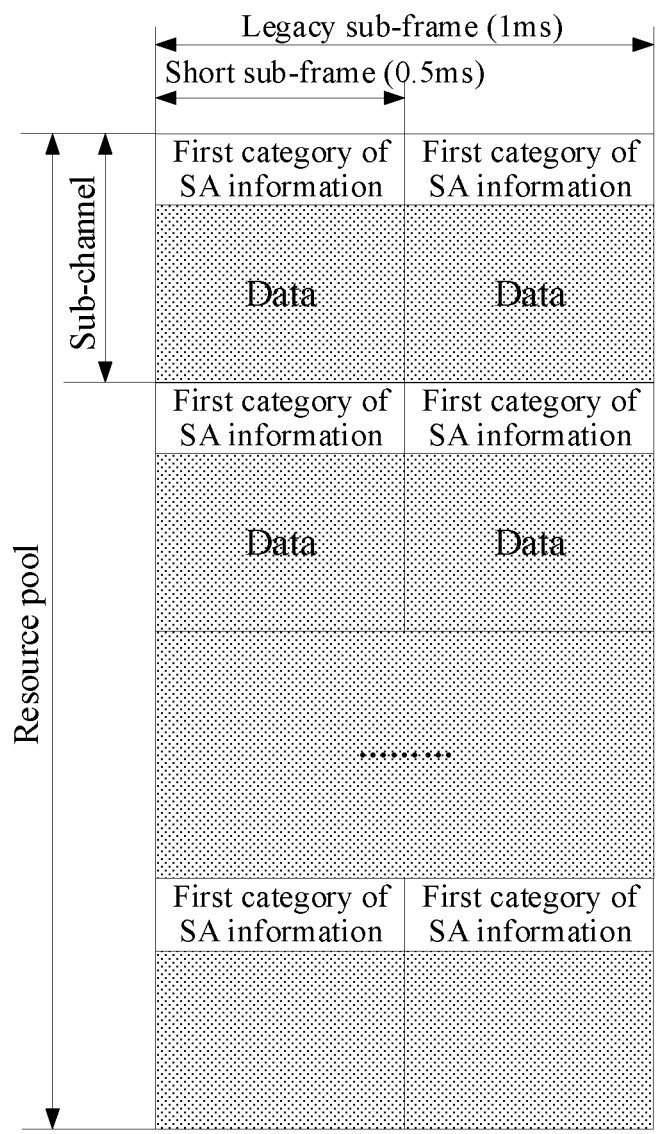
FIG. 5 is a first schematic diagram of configured time-frequency resources in a sub-frame according to an embodiment of the invention.
Figure 6:
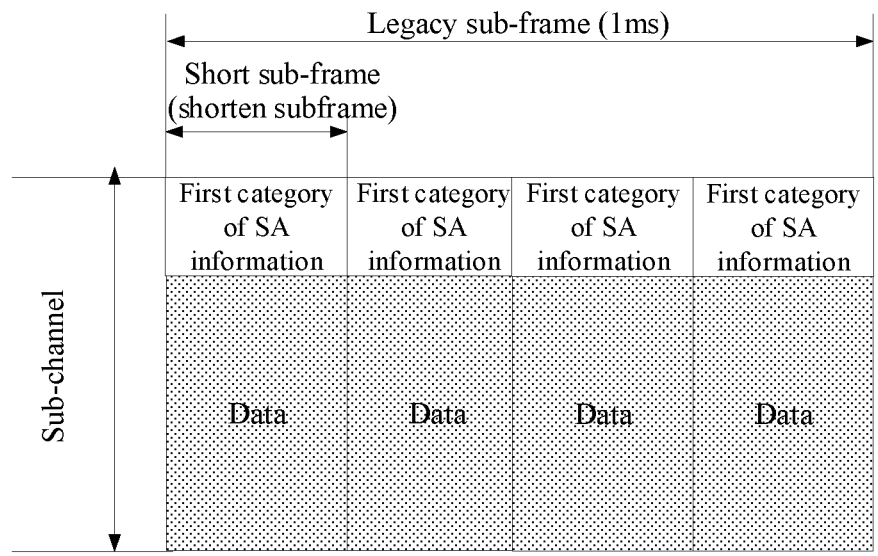
FIG. 6 is a second schematic diagram of configured time-frequency resources in a sub-frame according to an embodiment of the invention.

Particularly, a piece of first category of SA information occupies one timeslot in the time domain, or a piece of first category of SA information occupies a plurality of symbols in the time domain. When a piece of first category of SA information occupies one timeslot in the time domain, FIG. 5 illustrates time-frequency resources occupied by the first category of SA information, and data associated with the first category of SA information, in a legacy normal sub-frame. A sub-channel in a resource pool including a normal sub-frame includes two pieces of first category of SA information, and data associated with these two pieces of first category of SA information, and a piece of first category of SA information, and data associated with the first category of SA information are transmitted in a frequency division multiplexing mode. When a piece of first category of SA information occupies a plurality of symbols in the time domain, FIG. 6 illustrates time-frequency resources occupied by the first category of SA information, and data associated with the first category of SA information, in a normal sub-frame. A sub-channel in a resource pool including the normal sub-frame includes four pieces of first category of SA information, and data associated with these four pieces of first category of SA information, and a piece of first category of SA information, and data associated with the first category of SA information are transmitted in a frequency division multiplexing mode. Optionally the symbol can be an Orthogonal Frequency Division Multiplexing (OFDM) symbol.

In an implementation, a time length occupied by a first category of SA information transmitted by the first UE is less than a time length occupied by a normal sub-frame, thus shortening a delay of data transmission.

In an implementation, the first physical-layer format may or may not be the same as the second physical-layer format. When the first physical-layer format is the same as the second physical-layer format, a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format. When the first physical-layer format is different from the second physical-layer format, a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

The transmission mode of the first category of SA information, and the transmission mode of the data associated with the first category of SA information includes a uni-antenna transmission mode or a multi-antenna transmission mode, where the multi-antenna transmission mode includes a multi-antenna and multi-port transmit diversity mode, a multi-antenna and single-port transmit diversity mode, a multi-antenna and multi-port space multiplexing mode, etc. Particularly when the first physical-layer format is different from the second physical-layer format, if the uni-antenna transmission mode is applied to a piece of first category of SA information in the first physical-layer format, then the multi-antenna transmission mode will be applied to data associated with the first category of SA information in the second physical-layer format; and if the multi-antenna transmission mode is applied to a piece of first category of SA information in the first physical-layer format, then the uni-antenna transmission mode will be applied to data associated with the first category of SA information in the second physical-layer format.

Particularly, the first category of SA information includes one or any combination of: Modulation and Coding Scheme (MCS) indication information of the data associated with the first category of SA information, indication information of a Demodulation Reference Signal (DMRS) sequence, indication information of a data transmission mode, redundancy version indication information, resource reservation periodicity indication information, and service priority indication information, where the indication information of the DMRS sequence includes a DMRS initialization identifier (ID) and/or DMRS cyclic shift indication information.

Optionally, the first UE to transmit the first category of SA information, and the data associated with the first category of SA information further selects a time-frequency resource of at least one piece of second category of SA information from the set of time-frequency resources of SA information, and transmits the at least one second category of SA information in a third physical-layer format over the time-frequency resource of the at least one second category of SA information, where a piece of second category of SA information in the third physical-layer format occupies a time length of a sub-frame, and the uni-antenna transmission mode is applied to the second category of SA information so that both a new UE and a legacy UE can detect the second category of SA information. If the UE detecting the second category of SA information is a legacy UE, then the legacy UE will determine according to the second category of SA information that a time-frequency resource of data indicated by the second category of SA information is occupied by the first UE, so that the legacy UE can transmit the data over another time-frequency resource than the time-frequency resource occupied by the first UE to thereby avoid the resources from colliding with each other.

The second category of SA information generally includes: (1) a priority (there are eight priorities) occupying three bits, (2) a resource reservation periodicity indicating that the resource indicated by the current second category of SA information is still active in the next reservation periodicity, and occupying four bits, (3) the position (the start or the length) of a frequency resource for next transmission, which indicates a frequency resource to be occupied by the initially transmitted and retransmitted data indicated by the current second category of SA information, and occupies eight or less bits, (4) an initial transmission or retransmission time interval occupying four bits, all of which are 0 if the data are transmitted only once, (5) a modulation and coding scheme occupying five bits, (6) retransmission indication information indicating whether the data associated with the current first category of SA information is initially transmitted or retransmitted, and occupying one bit, and (7) reserved or padding bits, the number of which is equal to or greater than seven.

Optionally, the second category of SA information includes indication information indicating whether the data indicated by the second category of SA information shall be detected, so that the new UE may not detect the data indicated by the second category of SA information, upon reception of the second category of SA information to thereby lower the complexity of processing in the new UE. In a particular implementation, one of the reserved bits in the second category of SA information indicates whether a UE receiving the second category of SA information shall detect the third physical-layer format for the data indicated by the second category of SA information, where if the bit is set to 0, then it will indicate that the UE receiving the second category of SA information shall detect the third physical-layer format for the data indicated by the second category of SA information; and if the bit is set to 1, then it will indicate that the UE receiving the second category of SA information shall not detect the third physical-layer format for the data indicated by the second category of SA information.

Figure 7:
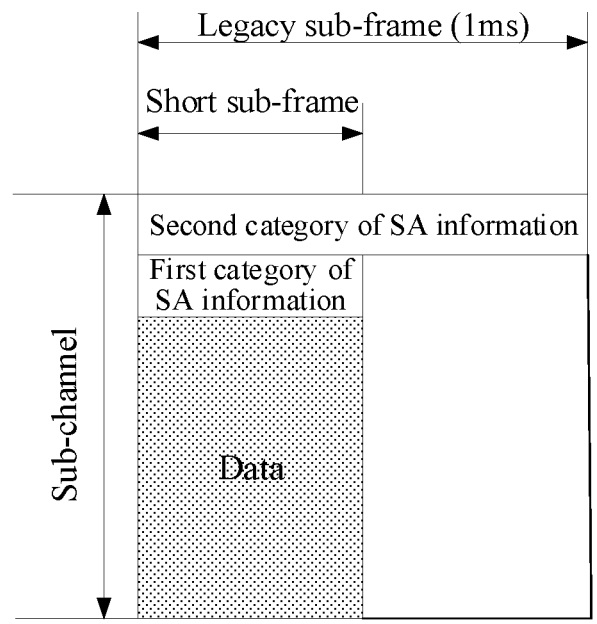
FIG. 7 is a schematic diagram of a relationship between time-frequency resources of data indicated by a piece of second category of SA information, and a time-frequency resource occupied by a piece of first category of SA information, and data associated with the first category of SA information according to an embodiment of the invention.

Optionally, time-frequency resources of data indicated by a piece of second category of SA information include a time-frequency resource occupied by at least one piece of first category of SA information, and a time-frequency resource occupied by data associated with the at least one piece of first category of SA information. In a particular implementation, when time-frequency resources of data indicated by a piece of second category of SA information include a time-frequency resource occupied by a piece of first category of SA information, and a time-frequency resource occupied by data associated with the first category of SA information, time-frequency resources in a normal sub-frame are configured as illustrated in FIG. 7, where the first category of SA information, and the data associated with the first category of SA information occupy one timeslot in the time domain.

Figure 8A:
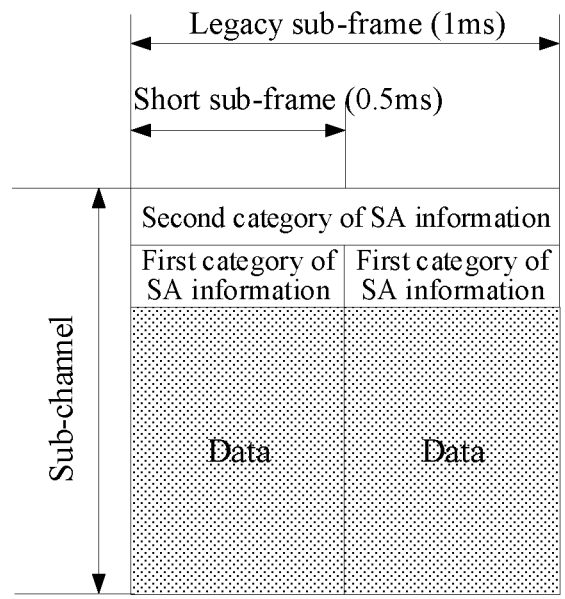
FIG. 8A is a first schematic diagram of a relationship between a time-frequency resource occupied by a second category of SA information, and a time-frequency resource occupied by a first category of SA information according to an embodiment of the invention.
Figure 8B:
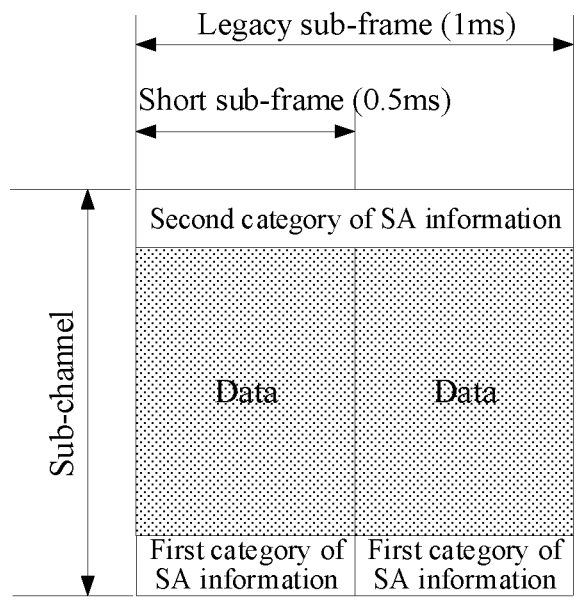
FIG. 8B is a second schematic diagram of a relationship between a time-frequency resource occupied by a second category of SA information, and a time-frequency resource occupied by a first category of SA information according to an embodiment of the invention.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold; and for example, a first category of SA information, and data associated with the first category of SA information occupy one timeslot in the time domain, and when a frequency resource occupied by a piece of first category of SA information is an area at a frequency below the first threshold among frequency resources of data indicated by a piece of second category of SA information, time-frequency resources of the first category of SA information, data associated with the first category of SA information, and the second category of SA information are configured as illustrated in FIG. 8A; and when a frequency resource occupied by a piece of first category of SA information is an area at a frequency above the second threshold among frequency resources of data indicated by a piece of second category of SA information, time-frequency resources of the first category of SA information, data associated with the first category of SA information, and the second category of SA information are configured as illustrated in FIG. 8B.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same UE, or data of different UEs will be transmitted over the time-frequency resources occupied by the plurality of pieces of first category of SA information, and the time-frequency resources occupied by the data associated with the plurality of pieces of first category of SA information.

Figure 9:
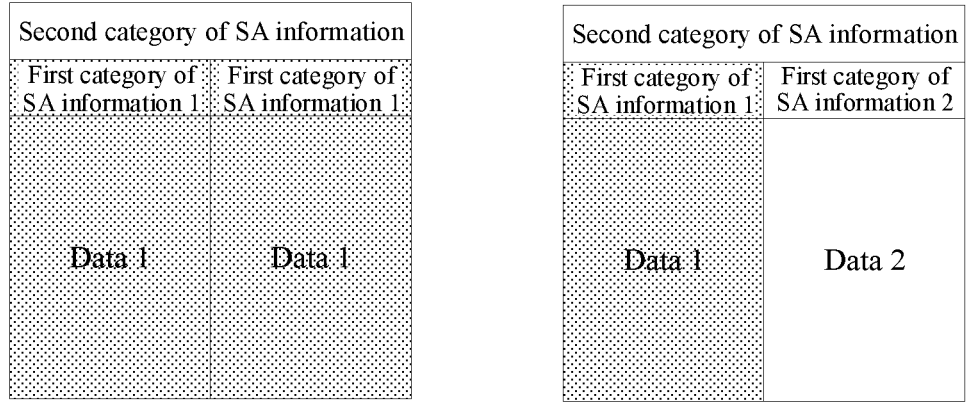
FIG. 9 is a schematic structural diagram of a sub-frame for transmitting data of the same UE according to an embodiment of the invention.

Particularly, if data of the same UE are transmitted over time-frequency resources occupied by a plurality of pieces of first category of SA information, and time-frequency resources occupied by data associated with the plurality of pieces of first category of SA information among time-frequency resources of data indicated by a piece of second category of SA information, then the same data or different data will be transmitted over the time-frequency resources occupied by the plurality of pieces of first category of SA information, and the time-frequency resources occupied by the data associated with the plurality of pieces of first category of SA information. Whether the same data or different data are transmitted can be determined by the base station according to a configuration of the network, or a pre-configuration of the UE, or can be determined by UEs in a group, and at this time, the structure of a normal sub-frame is as illustrated in FIG. 9, where a piece of first category of SA information, and data associated with the first category of SA information occupy one timeslot. If the same data of the same UE are transmitted over the time-frequency resources occupied by the plurality of pieces of first category of SA information, and the time-frequency resources occupied by the data associated with the plurality of pieces of first category of SA information, then the data associated with one of the plurality of pieces of first category of SA information will be initially transmitted data, and the data associated with another one of the plurality of pieces of first category of SA information will be retransmitted data, so the reliability of data transmission can be improved; and the UE receiving the plurality of pieces of first category of SA information, and the data associated with the plurality of pieces of first category of SA information can merge Hybrid Automatic Repeat reQuests (HARQs) for the plurality of pieces of first category of SA information, and the data associated with the plurality of pieces of first category of SA information to thereby reduce the number of times that the data are retransmitted, so as to shorten a delay.

If data of different UEs are transmitted over time-frequency resources occupied by a plurality of pieces of first category of SA information, and time-frequency resources occupied by data associated with the plurality of pieces of first category of SA information among time-frequency resources of data indicated by a piece of second category of SA information, then a UE receiving the second category of SA information in a normal sub-frame may not receive a first category of SA information, and data associated with the first category of SA information, transmitted by another UE in the sub-frame, where a destination UE of the first category of SA information, and the data associated with the first category of SA information, transmitted by the other UE is a UE transmitting the second category of SA information, so the data transmitted by the other UE will be retransmitted by transmitting the data in a paired sub-frame so that the UE transmitting the second category of SA information can receive the first category of SA information, and the data associated with the first category of SA information, transmitted by the other UE in the sub-frame, where a different UE transmits a second category of SA information in the paired sub-frame.

Figure 10:
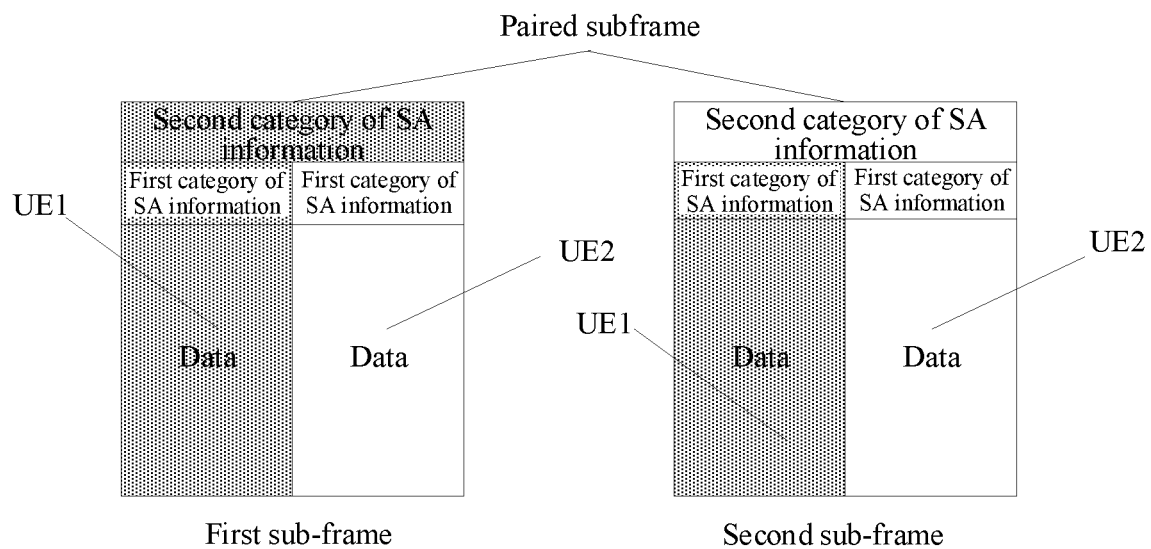
FIG. 10 is a first schematic structural diagram of a sub-frame transmitted in an adjacent-frequency mode according to an embodiment of the invention.

In a particular implementation, when time-frequency resources of data indicated by a piece of second category of SA information include time-frequency resources occupied by two pieces of first category of SA information, and time-frequency resources occupied by data associated with these two pieces of first category of SA information, the structure of paired sub-frames is as illustrated in FIG. 10, where in a first sub-frame, second category of SA information, and first category of SA information, and data associated with the first category of SA information, denoted in an area filled with dense dots in black, are transmitted by a UE 1, and first category of SA information, and data associated with the first category of SA information, denoted in a white area are transmitted by a UE 2. When a destination UE of the first category of SA information, and the data associated with the first category of SA information, transmitted by the UE 2 is the UE 1, the UE 1 cannot receive the data transmitted by the UE 2 in the first sub-frame, so the UE 2 shall further transmit a second sub-frame paired with the first sub-frame to the UE 1, and retransmit the data transmitted by the UE 2 to the UE 1, where in the second sub-frame, second category of SA information, and first category of SA information, and data associated with the first category of SA information, denoted in a white area are transmitted by the UE 2, and the first category of SA information, and the data associated with the first category of SA information, transmitted by the UE 1 are denoted in an area filled with dense dots in black; and the UE 2 transmits the same first category of SA information, and data associated with the first category of SA information in the first sub-frame and the second sub-frame.

Figure 11A:
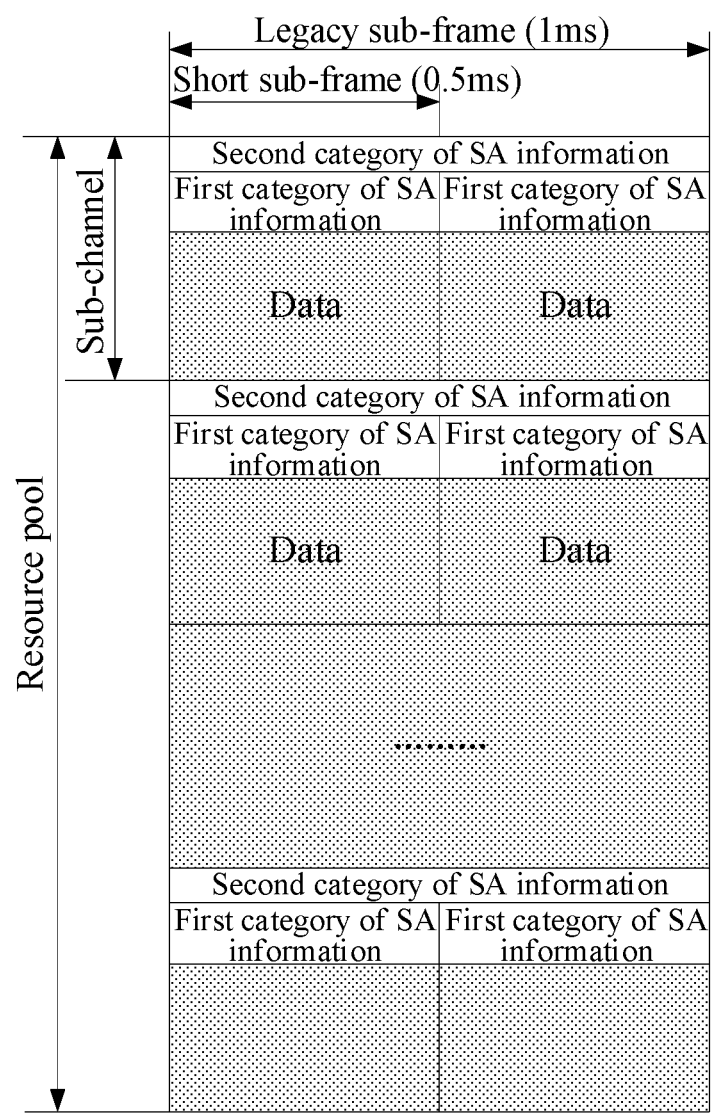
FIG. 11A is a second schematic structural diagram of a sub-frame transmitted in an adjacent-frequency mode according to an embodiment of the invention.
Figure 11B:
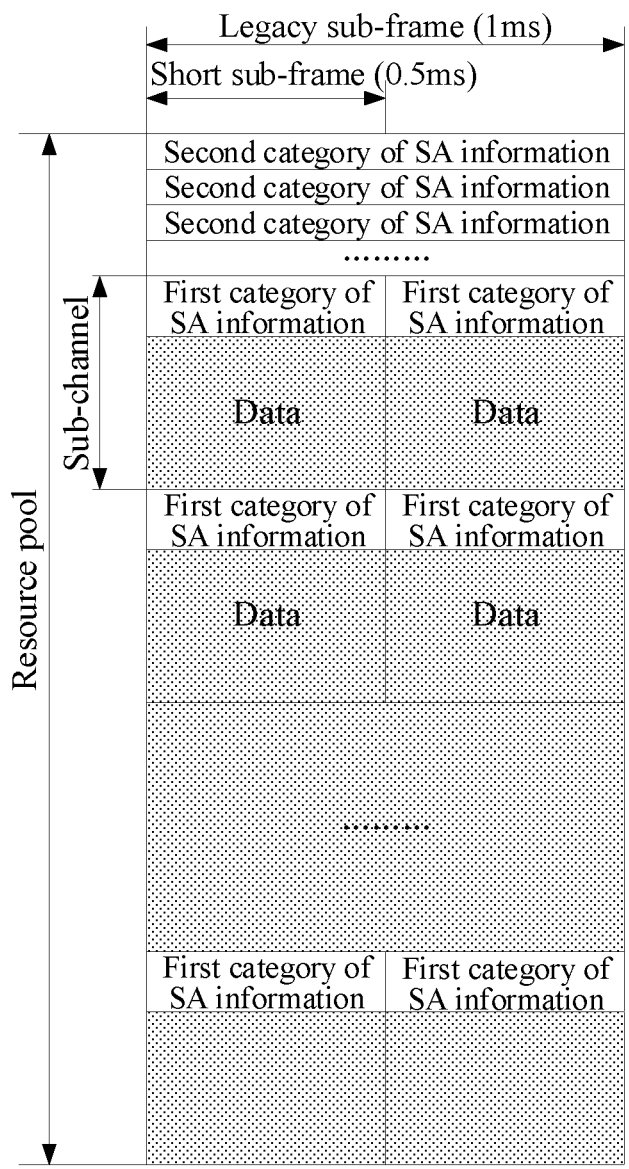
FIG. 11B is a schematic structural diagram of a sub-frame transmitted in a nonadjacent-frequency mode according to an embodiment of the invention.

In an implementation, second category of SA information, first category of SA information, and data associated with the first category of SA information are transmitted in the same sub-frame in an adjacent-frequency mode or a nonadjacent-frequency mode when a time-frequency resource of data indicated by the second category of SA information is adjacent or not adjacent to a time-frequency resource occupied by the second category of SA information. Particularly when a piece of first category of SA information, and data associated with the first category of SA information occupy one timeslot, the structure of a sub-frame transmitted in the adjacent-frequency mode is as illustrated in FIG. 11A, where a sub-channel includes a piece of second category of SA information, two pieces of first category of SA information, and data indicated by these two pieces of first category of SA information, these two pieces of first category of SA information, and the data indicated by these two pieces of first category of SA information occupy time-frequency resources of data indicated by the second category of SA information, and a time-frequency resource occupied by a piece of second category of SA information is adjacent to a time-frequency resource of data indicated by the second category of SA information; and the structure of a sub-frame transmitted in the nonadjacent-frequency mode is as illustrated in FIG. 11B, where a sub-channel includes a piece of second category of SA information corresponding to a sub-channel, a sub-channel includes two pieces of first category of SA information, and data indicated by these two pieces of first category of SA information, these two pieces of first category of SA information, and the data indicated by these two pieces of first category of SA information occupy time-frequency resources of data indicated by the second category of SA information (a sub-channel corresponding to the second category of SA information), and a time-frequency resource occupied by a piece of second category of SA information is not adjacent to a time-frequency resource of data indicated by the second category of SA information.

Figure 12:
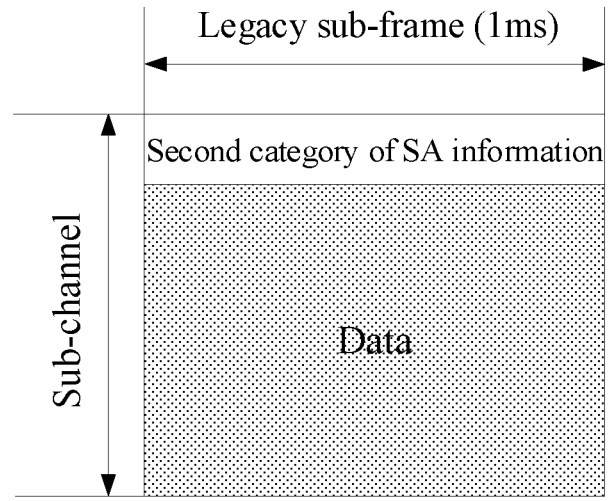
FIG. 12 is a schematic structural diagram of a sub-frame according to an embodiment of the invention.

In another embodiment of the invention, the first UE selects a time-frequency resource of at least one piece of second category of SA information from the set of time-frequency resources of SA information, and the UE transmits the at least one piece of second category of SA information over the time-frequency resource of the at least one piece of second category of SA information in the multi-antenna transmission mode, and transmits the data associated with the first category of SA information in the multi-antenna transmission mode or the uni-antenna transmission mode according to indication information in the at least one piece of second category of SA information, where FIG. 12 illustrates the structure of a sub-frame for transmitting the at least one piece of second category of SA information, and data associated with the at least one piece of second category of SA information.

Figure 13:
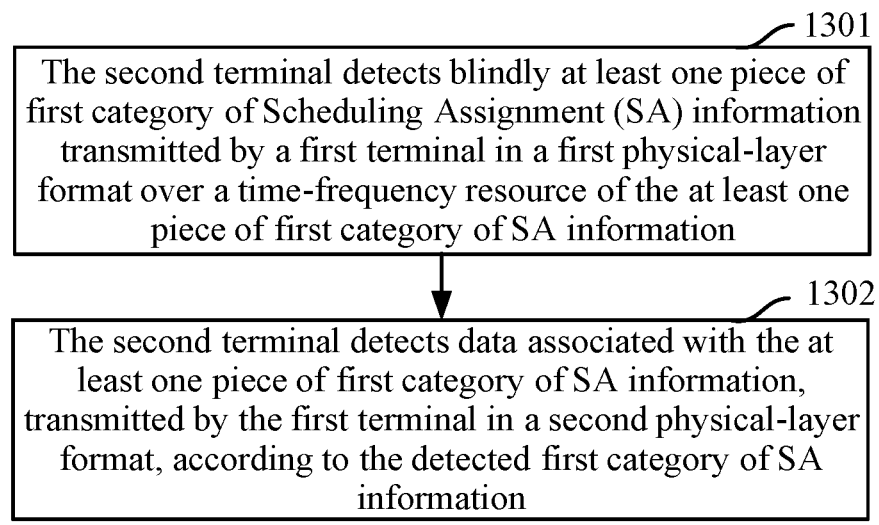
FIG. 13 is a schematic flow chart of a data receiving method according to an embodiment of the invention.

FIG. 13 illustrates a flow chart of a second UE receiving the at least one piece of first category of SA information, and the data associated with the at least one piece of first category of SA information, transmitted by the first UE, where the flow includes the following steps:

in the step 1301, the second UE detects blindly at least one piece of first category of Scheduling Assignment (SA) information transmitted by a first UE in a first physical-layer format over a time-frequency resource of the at least one piece of first category of SA information; and in the step 1302, the second UE detects data associated with the at least one piece of first category of SA information, transmitted by the first UE in a second physical-layer format, according to the detected first category of SA information.

The time-frequency resource of the at least one piece of first category of SA information is selected by the first UE from a set of time-frequency resources of SA information, and the first category of SA information includes at least time-frequency indication information of the data associated with the first category of SA information.

Optionally, the second UE further detects blindly at least one piece of second category of SA information transmitted by the first UE in a third physical-layer format over a time-frequency resource of the at least one piece of second category of SA information, where the time-frequency resource of the at least one piece of second category of SA information is selected by the first UE from the set of time-frequency resources of SA information, a piece of second category of SA information in the third physical-layer format occupies a time length of a sub-frame, and the second category of SA information is transmitted in a uni-antenna transmission mode.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same UE, or data of different UEs will be transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is the same as the second physical-layer format, where a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format.

Optionally, the first physical-layer format is different from the second physical-layer format, where a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

Optionally, the first category of SA information includes one or any combination of: Modulation and Coding Scheme (MCS) indication information of the data associated with the first category of SA information, indication information of a Demodulation Reference Signal (DMRS) sequence, indication information of a data transmission mode, redundancy version indication information, resource reservation periodicity indication information, and service priority indication information.

Figure 14:
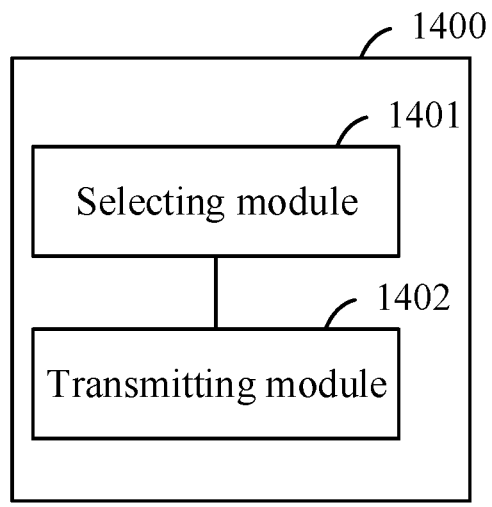
FIG. 14 is a first schematic structural diagram of a UE according to an embodiment of the invention.

Based upon the same inventive idea, an embodiment of the invention further provides a terminal 1400, and reference can be made to the description of the method embodiment for a particular implementation of the terminal, so a repeated description thereof will be omitted, and as illustrated in FIG. 14, the terminal generally includes:

a selecting module 1401 is configured to select a time-frequency resource of at least one piece of first category of Scheduling Assignment (SA) information from a set of time-frequency resources of SA information; and a transmitting module 1402 is configured to transmit the at least one piece of first category of SA information over the time-frequency resource of the at least one piece of first category of SA information in a first physical-layer format, and to transmit data associated with the at least one piece of first category of SA information in a second physical-layer format according to indication information in the at least one piece of first category of SA information, where the at least one piece of first category of SA information includes at least the time-frequency resource indication information of the data associated with the at least one piece of first category of SA information.

Optionally, the selecting module 1401 is further configured to select a time-frequency resource of at least one piece of second category of SA information from the set of time-frequency resources of SA information, and the transmitting module 1402 is further configured to transmit the at least one second category of SA information in a third physical-layer format over the time-frequency resource of the at least one second category of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same terminal, or data of different terminals will be transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is the same as the second physical-layer format, where a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format.

Optionally, the first physical-layer format is different from the second physical-layer format, where a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

Optionally, the first category of SA information includes one or any combination of: Modulation and Coding Scheme (MCS) indication information of the data associated with the first category of SA information, indication information of a Demodulation Reference Signal (DMRS) sequence, indication information of a data transmission mode, redundancy version indication information, resource reservation periodicity indication information, and service priority indication information.

In the embodiment of the invention, the selecting module 1401 can be embodied as a processor or another physical device, and the transmitting module 1402 can be embodied as a transceiver or another physical device.

Figure 15:
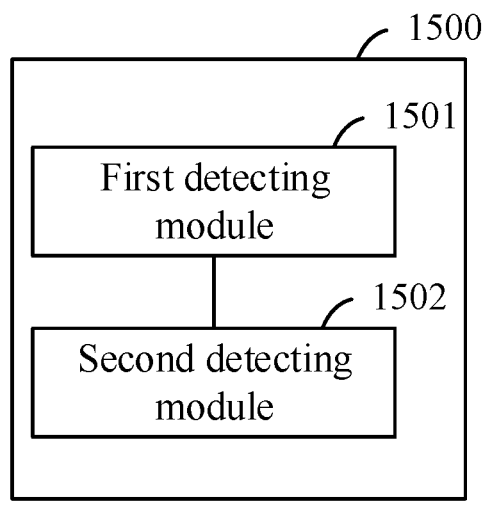
FIG. 15 is a second schematic structural diagram of a UE according to an embodiment of the invention.

Based upon the same inventive idea, an embodiment of the invention further provides a terminal 1500, and reference can be made to the description of the method embodiment for a particular implementation of the terminal, so a repeated description thereof will be omitted, and as illustrated in FIG. 15, the terminal generally includes:

a first detecting module 1501 is configured to detect blindly at least one piece of first category of Scheduling Assignment (SA) information transmitted by a first terminal in a first physical-layer format over a time-frequency resource of the at least one piece of first category of SA information; and a second detecting module 1502 is configured to detect data associated with the at least one piece of first category of SA information, transmitted by the first terminal in a second physical-layer format, according to the detected first category of SA information, wherein the time-frequency resource of the at least one piece of first category of SA information is selected by the first terminal from a set of time-frequency resources of SA information, and the first category of SA information includes at least time-frequency indication information of the data associated with the first category of SA information.

Optionally, the first detecting module 1501 is further configured to detect blindly at least one piece of second category of SA information transmitted by the first terminal in a third physical-layer format over a time-frequency resource of the at least one piece of second category of SA information, where the time-frequency resource of the at least one piece of second category of SA information is selected by the first terminal from the set of time-frequency resources of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same terminal, or data of different terminals will be transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is the same as the second physical-layer format, where a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format.

Optionally, the first physical-layer format is different from the second physical-layer format, where a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

In the embodiment of the invention, either of the modules above can be embodied as a processor or another physical device.

Figure 16:
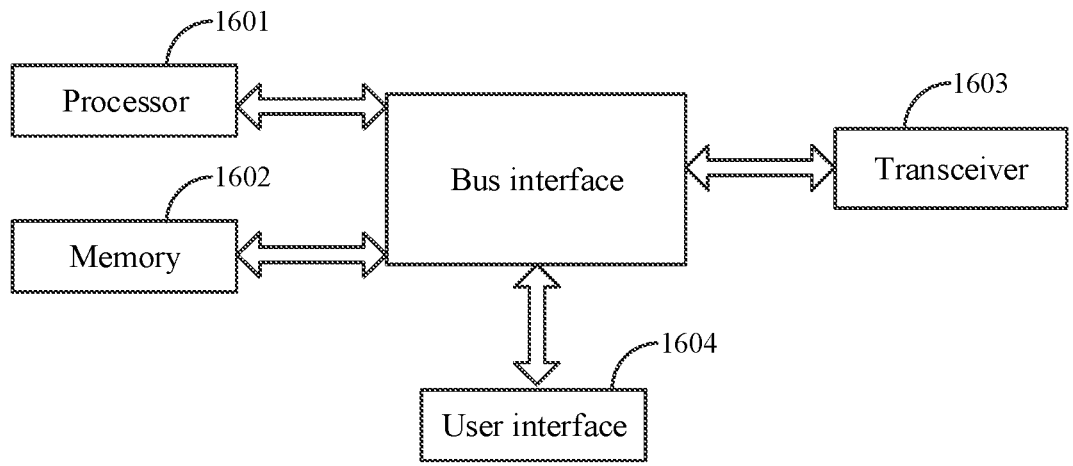
FIG. 16 is a third schematic structural diagram of a UE according to an embodiment of the invention.

Based upon the same inventive idea, an embodiment of the invention further provides a terminal, and reference can be made to the description of the method embodiment for a particular implementation of the terminal, so a repeated description thereof will be omitted, and as illustrated in FIG. 16, the terminal generally includes:

a processor 1601 is configured to read and execute program in a memory 1602:

to select a time-frequency resource of the at least one piece of first category of SA information from a set of time-frequency resources of Scheduling Assignment (SA) information; and to transmit the at least one piece of first category of SA information over the time-frequency resource of the at least one piece of first category of SA information in a first physical-layer format, and to transmit data associated with the at least one piece of first category of SA information in a second physical-layer format according to indication information in the at least one piece of first category of SA information, where the at least one piece of first category of SA information includes at least the time-frequency resource indication information of the data associated with the at least one piece of first category of SA information; and a transceiver 1603 is configured to transmit and receive data under the control of the processor 1601.

Optionally, the processor 1601 is further configured to select a time-frequency resource of at least one piece of second category of SA information from the set of time-frequency resources of SA information, and the transmitting module 1402 is further configured to transmit the at least one second category of SA information in a third physical-layer format over the time-frequency resource of the at least one second category of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same terminal, or data of different terminals will be transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is the same as the second physical-layer format, where a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format.

Optionally, the first physical-layer format is different from the second physical-layer format, where a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

Optionally, the first category of SA information includes one or any combination of: Modulation and Coding Scheme (MCS) indication information of the data associated with the first category of SA information, indication information of a Demodulation Reference Signal (DMRS) sequence, indication information of a data transmission mode, redundancy version indication information, resource reservation periodicity indication information, and service priority indication information.

Here in FIG. 16, the bus architecture can include any number of interconnecting buses and bridges to particularly link together various circuits including one or more processors represented by the processor 1600, and one or more memories represented by the memory 1602. The bus architecture can further link together various other circuits, e.g., a peripheral device, a manostat, a power management circuit, etc., all of which are well known in the art, so a further description thereof will be omitted in this context. The bus interface serves as an interface. The transceiver 1603 can be a number of elements, e.g., a transmitter and a receiver, which are units for communication with various other devices over a transmission medium. For different user equipments, the user interface 1604 can also be an interface via which devices are connected internally and externally as needed, and the connected devices include but will not be limited to a keypad, a monitor, a speaker, a microphone, a joystick, etc.

The processor 1601 is responsible for managing the bus architecture and performing normal processes, and the memory 1602 can store data for use by the processor 1601 in performing the operations.

Optionally, the processor 1601 can be a Central Processing Unit (CPU), an Application-Specific Integrated Circuit (ASIC), a Field-Programmable Gate Array (FPGA), or a Complex Programmable Logic Device (CPLD).

Figure 17:
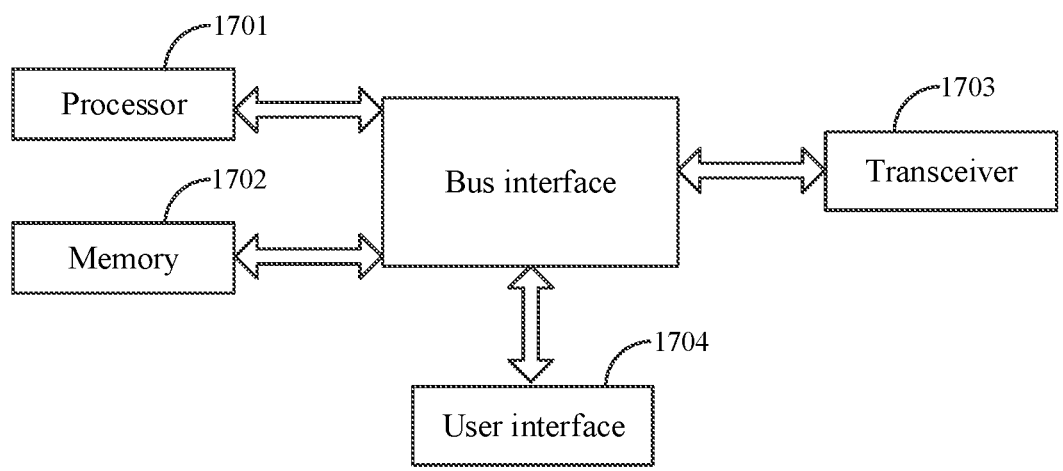
FIG. 17 is a fourth schematic structural diagram of a UE according to an embodiment of the invention.

Based upon the same inventive idea, an embodiment of the invention further provides a terminal, and reference can be made to the description of the method embodiment for a particular implementation of the terminal, so a repeated description thereof will be omitted, and as illustrated in FIG. 17, the terminal generally includes:

a processor 1701 is configured to read and execute program in a memory 1702:

to detect blindly at least one piece of first category of Scheduling Assignment (SA) information transmitted by a first terminal in a first physical-layer format over a time-frequency resource of the at least one piece of first category of SA information; and to detect data associated with the at least one piece of first category of SA information, transmitted by the first terminal in a second physical-layer format, according to the detected first category of SA information, wherein the time-frequency resource of the at least one piece of first category of SA information is selected by the first terminal from a set of time-frequency resources of SA information, and the first category of SA information includes at least time-frequency indication information of the data associated with the first category of SA information; and the transceiver 1703 is configured to transmit and receive data under the control of the processor 1701.

Optionally, the processor 1701 is further configured to detect blindly at least one piece of second category of SA information transmitted by the first terminal in a third physical-layer format over a time-frequency resource of the at least one piece of second category of SA information, where the time-frequency resource of the at least one piece of second category of SA information is selected by the first terminal from the set of time-frequency resources of SA information.

Optionally, the second category of SA information includes indication information indicating whether data indicated by the second category of SA information shall be detected in the third physical-layer format.

Optionally, time-frequency resources of data indicated by a piece of second category of SA information include a time-frequency resource occupied by at least one piece of first category of SA information, and a time-frequency resource occupied by data associated with the at least one piece of first category of SA information.

Optionally, a frequency resource occupied by a piece of first category of SA information is an area at a frequency below a first threshold among frequency resources of data indicated by a piece of second category of SA information, or an area at a frequency above a second threshold among the frequency resources of data indicated by the second category of SA information, where the second threshold is greater than the first threshold.

Optionally, if time-frequency resources of data indicated by a piece of second category of SA information include time-frequency resources occupied by a plurality of pieces of first category of SA information, and time-frequency resources occupied by data associated with the plurality of pieces of first category of SA information, then data of the same terminal, or data of different terminals will be transmitted over the time-frequency resources occupied by the plurality of pieces of first category of SA information, and the time-frequency resources occupied by the data associated with the plurality of pieces of first category of SA information.

Optionally, a piece of first category of SA information occupies one timeslot in the time domain, or a piece of first category of SA information occupies a plurality of symbols in the time domain.

Optionally, the first physical-layer format is the same as the second physical-layer format, where a time length occupied by a piece of first category of SA information in the first physical-layer format is the same as a time length occupied by data associated with the first category of SA information in the second physical-layer format, and there is the same transmission mode for a piece of first category of SA information in the first physical-layer format, and data associated with the first category of SA information in the second physical-layer format.

Optionally, the first physical-layer format is different from the second physical-layer format, where a time length occupied by a piece of first category of SA information in the first physical-layer format is the same as a time length occupied by data associated with the first category of SA information in the second physical-layer format, and there are different transmission modes for a piece of first category of SA information in the first physical-layer format, and data associated with the first category of SA information in the second physical-layer format.

Here in FIG. 17, the bus architecture can include any number of interconnecting buses and bridges to particularly link together various circuits including one or more processors represented by the processor 1700, and one or more memories represented by the memory 1702. The bus architecture can further link together various other circuits, e.g., a peripheral device, a manostat, a power management circuit, etc., all of which are well known in the art, so a further description thereof will be omitted in this context. The bus interface serves as an interface. The transceiver 1703 can be a number of elements, e.g., a transmitter and a receiver, which are units for communication with various other devices over a transmission medium. For different user equipments, the user interface 1704 can also be an interface via which devices are connected internally and externally as needed, and the connected devices include but will not be limited to a keypad, a monitor, a speaker, a microphone, a joystick, etc.

The processor 1701 is responsible for managing the bus architecture and performing normal processes, and the memory 1702 can store data for use by the processor 1701 in performing the operations.

Optionally, the processor 1701 can be a Central Processing Unit (CPU), an Application-Specific Integrated Circuit (ASIC), a Field-Programmable Gate Array (FPGA), or a Complex Programmable Logic Device (CPLD).

Moreover, the terminal as referred to in the embodiments of the invention can also be referred to as a User Equipment (UE), a Mobile Station (MS), a mobile terminal, etc., and optionally the user equipment can be capable of communicating with one or more core networks over a Radio Access Network (RAN). For example, the terminal can be a mobile phone (referred to as a "cellular" phone), a mobile computer, etc., and for example, the terminal can also be a portable, pocket, handheld, built-in-computer, or on-vehicle mobile device.

An embodiment of the invention further provides a computer storage medium storing computer executable instructions configured to cause the computer to perform the method according to any one of the embodiments above of the invention.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

As can be apparent, data can be transmitted between UEs as required for the evolving V2X technologies in the embodiments of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A data transmitting method, the method comprising:
   selecting, by a first terminal, a time-frequency resource of a first category of Scheduling Assignment (SA) information from a set of time-frequency resources of SA information; and
   transmitting, by the first terminal, the first category of SA information over the time-frequency resource of the first category of SA information in a first physical-layer format, and transmitting data associated with the first category of SA information in a second physical-layer format according to indication information in the first category of SA information, wherein the first category of SA information comprises the time-frequency resource indication information of the data associated with the first category of SA information;

wherein the method further comprises:

selecting, by the first terminal, a time-frequency resource of a second category of SA information from another set of time-frequency resources of SA information, and transmitting the second category of SA information in a third physical-layer format over the time-frequency resource of the second category of SA information;

wherein time-frequency resources of data indicated by a piece of second category of SA information comprise a time-frequency resource occupied by at least one piece of first category of SA information, and a time-frequency resource occupied by data associated with the at least one piece of first category of SA information;

wherein the first physical-layer format is same as the second physical-layer format or the first physical-layer format is different from the second physical-layer format the first physical-layer format, the second physical-layer format and the third physical-layer format correspond to a uni-antenna transmission mode or a multi-antenna transmission mode; the third physical-layer format occupies a time length of a sub-frame, and the uni-antenna transmission mode is applied to the second category of SA information;

wherein the second category of SA information comprises indication information indicating whether data indicated by the second category of SA information shall be detected in the third physical-layer format.

2. The method according to claim 1, wherein if time-frequency resources of data indicated by a piece of second category of SA information comprise time-frequency resources occupied by a plurality of pieces of first category of SA information, and time-frequency resources occupied by data associated with the plurality of pieces of first category of SA information, data of a same terminal, or data of different terminals is transmitted over the time-frequency resources occupied by the plurality of pieces of first category of SA information, and the time-frequency resources occupied by the data associated with the plurality of pieces of first category of SA information.

3. The method according to claim 1, wherein a piece of first category of SA information occupies one timeslot in the time domain, or a piece of first category of SA information occupies a plurality of symbols in the time domain;

the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format;

or a piece of first category of SA information occupies one timeslot in the time domain, or a piece of first category of SA information occupies a plurality of symbols in the time domain;

the first physical-layer format is different from the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is different from a transmission mode for data associated with the first category of SA information in the second physical-layer format.

4. A data receiving method, comprising:

detecting, by a second terminal blindly, a first category of Scheduling Assignment (SA) information transmitted by a first terminal in a first physical-layer format over a time-frequency resource of the first category of SA information; and detecting, by the second terminal, data associated with the first category of SA information, transmitted by the first terminal in a second physical-layer format, according to detected first category of SA information, wherein the time-frequency resource of the first category of SA information is selected by the first terminal from a set of time-frequency resources of SA information, and the first category of SA information comprises time-frequency indication information of the data associated with the first category of SA information;

wherein the method further comprises:

detecting, by the second terminal blindly, a second category of SA information transmitted by the first terminal in a third physical-layer format over a time-frequency resource of the second category of SA information, wherein the time-frequency resource of the second category of SA information is selected by the first terminal from another set of time-frequency resources of SA information;

wherein the first physical-layer format is same as the second physical-layer format or the first physical-layer format is different from the second physical-layer format; the first physical-layer format, the second physical-layer format and the third physical-layer format correspond to a uni-antenna transmission mode or a multi-antenna transmission mode; the third physical-layer format occupies a time length of a sub-frame, and the uni-antenna transmission mode is applied to the second category of SA information;

wherein the second category of SA information comprises indication information indicating whether data indicated by the second category of SA information shall be detected in the third physical-layer format.

5. The method according to claim 4, wherein if time-frequency resources of data indicated by a piece of second category of SA information comprise time-frequency resources occupied by a plurality of pieces of first category of SA information, and time-frequency resources occupied by data associated with the plurality of pieces of first category of SA information, data of a same terminal, or data of different terminals is transmitted over the time-frequency resources occupied by the plurality of pieces of first category of SA information, and the time-frequency resources occupied by the data associated with the plurality of pieces of first category of SA information.

6. The method according to claim 4, wherein a piece of first category of SA information occupies one timeslot in the time domain, or a piece of first category of SA information occupies a plurality of symbols in the time domain;

the first physical-layer format is same as the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is same as a transmission mode for data associated with the first category of SA information in the second physical-layer format;

or a piece of first category of SA information occupies one timeslot in the time domain, or a piece of first category of SA information occupies a plurality of symbols in the time domain;

the first physical-layer format is different from the second physical-layer format, wherein a time length occupied by a piece of first category of SA information in the first physical-layer format is same as a time length occupied by data associated with the first category of SA information in the second physical-layer format, and a transmission mode for a piece of first category of SA information in the first physical-layer format is different from a transmission mode for data associated with the first category of SA information in the second physical-layer format.

7. A terminal, comprising a memory configured to store a computer readable program, and a processor configured to execute the computer readable program to perform the method of claim 1.

8. A terminal, comprising a memory configured to store a computer readable program, and a processor configured to execute the computer readable program to perform the method of claim 4.

* * * * *